United States Patent [19]

Awalt

[11] Patent Number: 4,488,509

[45] Date of Patent: Dec. 18, 1984

[54] FEEDER SYSTEM EMPLOYING AN ADJUSTABLE DISPENSER OUTLET

[76] Inventor: Patrick M. Awalt, P.O. Box 221, Waco, Ga. 30182

[21] Appl. No.: 492,008

[22] Filed: May 5, 1983

[51] Int. Cl.³ .......................................... A01K 39/012
[52] U.S. Cl. ............................................... 119/53
[58] Field of Search .................. 119/53, 53.5, 52 AF, 119/52 A, 51 R

[56] References Cited

U.S. PATENT DOCUMENTS

| | | | |
|---|---|---|---|
| 3,105,463 | 10/1963 | Pilch | 119/53 X |
| 3,585,970 | 6/1971 | Scott et al. | 119/53 |
| 3,827,405 | 8/1974 | Allen | 119/53 |

*Primary Examiner*—Hugh R. Chamblee
*Attorney, Agent, or Firm*—Patrick F. Henry

[57] ABSTRACT

A feed dispenser may be attached to an existing feed supply conduit to utilize existing space. The dispenser comprises a bracket housing collar mounted about a conduit opening and a dispenser outlet which is adjustable by means of a sliding sleeve to gauge the correct amount of feed in the pan or feed lid. A pan beneath the outlet receives the feed and is controlled by the feed in the pan backing up into the outlet.

15 Claims, 3 Drawing Figures

U.S. Patent     Dec. 18, 1984     4,488,509
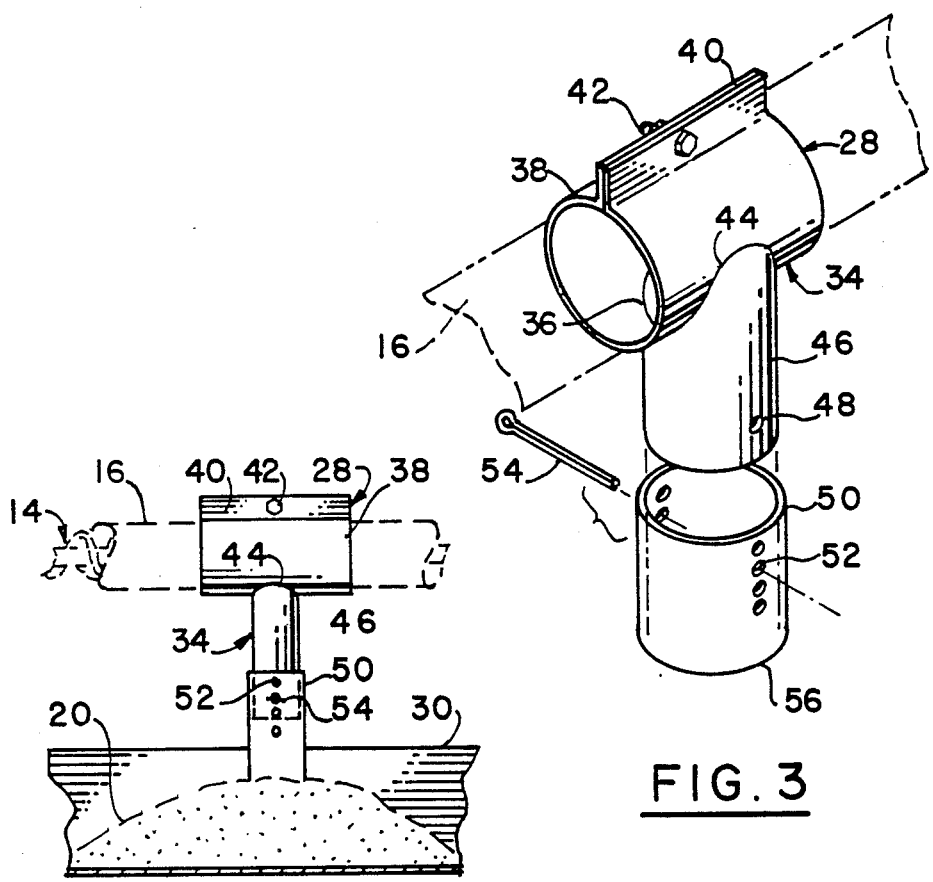
FIG. 3
FIG. 2
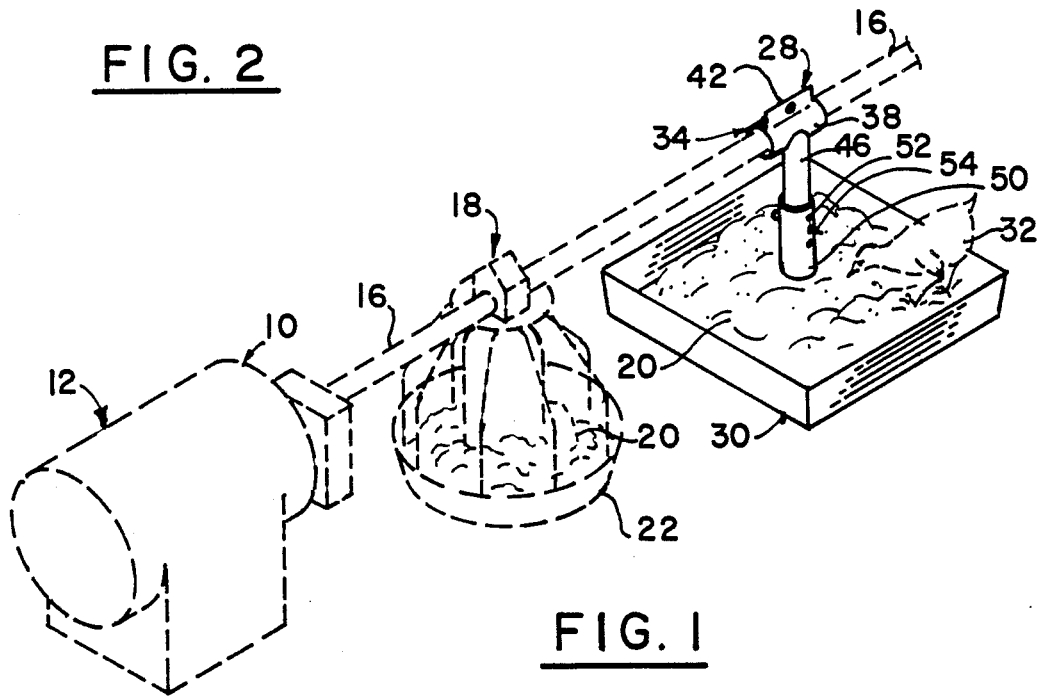
FIG. 1

FEEDER SYSTEM EMPLOYING AN ADJUSTABLE DISPENSER OUTLET

1. FIELD OF THE INVENTION

Controlled dispensing wherein animal feed is continuously delivered from a supply source to individual animal feeders such as poultry feeder pans.

2. BACKGROUND OF THE INVENTION

Prior arrangement in poultry feeders is disclosed in U.S. Pat. Nos. 3,388,690, 4,070,990 and Re. 25,589 in which there is a feed source, a feed pan, and means for conducting feed from the source of the pan. The feed pan is arranged with an adjustable feed control and the poultry feed is moved by an auger means through a conduit to the individual, spaced feed pans. One arrangement has been on the market by the trademarks "CHORE-MATIC" or "CHORE-TIME" systems manufactured by Chore-Time Equipment, Inc. of Milford, Ind., 46542, U.S.A. Such systems and arrangements, however, are not suitable for small poultry chicks such as baby chickens during the first two weeks of feeding which is a very critical time. Proper gauging of the feed is important for correct feeding practices according to accepted standards to prevent waste but assure adequate feeding to the small chicks. When the correct amount of feed is controlled and continuously delivered, poultry becomes more efficient by converting the feed to energy which means more proceeds in less amount of time. Also, there is a lowering of the cost of time and labor needed according to conventional methods of feeding. Some baby chickens require four hours a day of feeding. The present arrangement saves time and labor while improving the efficiency of feeding.

SUMMARY OF OBJECTIVES AND PREFERRED EMBODIMENT

An object of this invention is to provide a dispenser arrangement which may be used on a conventional poultry dispensing system of the sort mentioned previously or in a system intended only for small chicks.

Another object of this invention is to provide a dispenser outlet of simple construction which includes a simple adjustment to lengthen or shorten the outlet thereby controlling the amount of food in the pan beneath the outlet for the purpose of feeding small chicks.

Another object resides in the simplicity of construction whereby the present dispenser arrangement may be readily attached to an existing dispensing conduit of existing systems or may be sold and distributed as optional items.

The present system employs a plurality of individual stations which as mentioned previously may be applied inbetween existing stations on other feeders. A bracket dispenser comprises a housing or collar which attaches about a dispensing opening that has been made in the existing dispensing conduit. The collar includes a dispensing outlet which may be in the form of a tubular pipe in communication with the opening in the conduit. The outlet conduit has a small hole near the bottom and a dispensing adjustment collar is placed around the opening so as to align one set of several spaced sets of holes to receive a key thereby providing an adjustment of the feed which is dispensed into a pan throught the piling of the feed and the backing-up into the outlet.

Other and further objects and advantages of this invention will become apparent upon reading the following description of a preferred embodiment taken in conjunction with the accompanying drawings.

BRIEF DESCRIPTION OF THE DRAWINGS

FIG. 1 is a perspective view of part of a conventional system of the sort mentioned previously showing the present device added thereto as one station.

FIG. 2 is an enlarged side elevation view of the device shown in the one station of FIG. 1 with parts broken away.

FIG. 3 is an enlarged perspective view of the dispensing outlet shown in FIGS. 1 and 2.

DESCRIPTION OF A PREFERRED EMBODIMENT

As mentioned previously, a conventional poultry dispensing system 10 comprises a motor drive 12 operating a screw or flexible auger drive 14 inside a feeding and dispensing conduit or pipe 16 on which are located stations 18 which receive and dispense measured quantities of chicken feed 20 into a pan 22 in the manner known in the art and described in previously mentioned U.S. Pat. Nos. 3,338,690; 4,070,990 and Re. 25,589. A system is manufactured and sold by Chore-Time Equipment, Inc., Milford, Ind., 46542, U.S.A. The dispensing arrangement 18 in the previous system is not entirely suitable for small baby chicks during the approximate first two weeks which is a very critical time from the standpoint of development and maturity.

The present invention comprises a plurality of feeding stations 28 for dispensing chicken feed 20 into a pan 30 of substantially rectangular construction for the purpose of feeding small chicks 32 which may actually get into the inside of the pan. The chicken feed 20 piles up in the manner shown in FIGS. 1 and 2 until it is stopped by means of the present dispensing device 34 which may be readily applied to the existing poultry feeding system 10 by drilling or otherwise creating dispensing openings 36 at the individual stations 28 to receive the composite dispensing arrangement 34 which is like a bracket and comprises a housing in the form of a collar 38 which is split on one side to form matching attachment plates 40 having an attachment screw 42 therethrough whereby the collar 38 is opened and applied to the conduit 16 and then tightened in place about the opening 36. Welded, braised, soldered or otherwise attached to the open outlet portion 44 of collar 38 is the dispensing member 46 which is in the form of a tube having a pair of small openings 48 therethrough and the lower end of the member 46 receives an adjustment sleeve 50 which may be made from plastic, metal or other material. Sleeve 50 has a plurality of aligned openings 52 vertically spaced thereon to match selectively with the pair of openings 48 for receiving an adjustment pin 54 inserted therethrough thereby providing a selective adjustment of the length of the combined length of member 46 and sleeve 50 for the purpose of adjusting the bottom outlet 56 which controls the amount of feed 20 in the pile in pan 30 until the feed 20 backs up or fills the outlet member 46 up inside the opening 36 to cut off the supply of feed from time to time whenever the pile reaches the ultimate height. Individual smaller chicks 32 are able to feed from the pan 30.

While I have shown and described a preferred embodiment in this invention together with a suggested mode of operation and attributed certain known characteristics thereto, this is by way of illustration and does not constitute any sort of limitation on the invention because various alterations, changes, deviations and departures may be made in the embodiment without avoiding the scope of the invention as defined only by a proper interpretation of the appended claims.

What is claimed is:

1. In a dispensing arrangement for small birds, such as 1 day to approximately 14 day old baby chickens, to be applied to a feed conduit, including a system having existing feed stations thereon, in which feed is continuously supplied:

means on said conduit at spaced, selected open locations thereon providing an open feed outlet which dispenses feed downwardly by gravity and said outlet comprising a feed outlet opening in the bottom through which the feed is dispensed and into which feed will back up temporarily to close the respective opening, said means comprising attachment means attaching said outlet to said open location on said conduit, and separate and detached container means supported on the ground beneath each of said outlets for containing feed therein which falls from said outlet piling to a height and into said feed outlet and opening ultimately at times to stop the feeding thereof, said container having unobstructed low sides above the ground so that the small birds can get in the container and said container being effectively open and unobstructed beneath said feed conduit whereby the small birds cannot be trapped.

2. The arrangement in claim 1, including also:

means for adjusting the length of said feed outlet above the bottom of said container means thereby controlling the amount of accumulated feed which is permitted to pile before the accumulated feed back-fills into the dispenser opening thereby gauging the correct amount of feed in the container means.

3. The device in claim 1 wherein said attachment means consists of a single, integral housing having opposed members which are attachable about the feed conduit and means for connecting said opposed members to attach said housing.

4. The device in claim 3 wherein said feed outlet is a conduit member having adjustment means for adjusting the length of said member at the bottom to adjust the height of the bottom above the level of the feed and container.

5. The device in claim 3 wherein said housing consists of a split sleeve having an opening therein for alignment with said open location on said conduit and said means for connecting comprises at least one bolt connecting said split sleeve, said feed outlet being a single tube having one end attached to said sleeve at said opening and said sleeve being selectively movable out of the way to close the feed conduit open location.

6. The device claimed in claim 1 wherein said feed outlet is a second conduit member having adjustment means for adjusting the length of said member at the bottom to adjust the height of the bottom above the level of the feed and the container.

7. The device claimed in claim 6 wherein said adjustment means comprises an open member adjustably mounted about said outlet conduit thereon and means for attaching said adjustment member in one or several selected positions upwardly or downwardly thereon.

8. The device in claim 1 including means on said conduit comprising a housing adjustable on said conduit to close a respective outlet, said housing having the outlet thereon.

9. The device claimed in claim 8 wherein said feed outlet is a second conduit member and there is an adjustment means for adjusting the length of said second conduit member at the bottom to adjust the height of the bottom above the level of the feed and the container.

10. The device claimed in claim 9 wherein said adjustment means comprises an open adjustment member adjustably mounted about said second conduit member and means for attaching said adjustment member in one of several selected positions upwardly or downwardly thereon to selectively increase or decrease the effective length of said outlet conduit.

11. The device in claim 10 wherein said outlet conduit has holes therein and said open adjustment member is a sleeve which has adjustment openings therein for selective use with said holes in said conduit, and a member insertable in and removable from said openings.

12. The device in claim 1 including means for attachment on said feed conduit comprising a housing adjustable on said feed conduit to close a respective outlet, said housing having the feed outlet thereon.

13. The device claimed in claim 12 wherein there is an adjustment means for adjusting the length of said conduit member at the bottom to adjust the height of the bottom above the level of the feed in the container means.

14. The device claimed in claim 13 wherein said adjustment means comprises an open member adjustably mounted about said outlet conduit thereon and means for attaching said adjustment member in one or several selected positions upwardly or downwardly therein to selectively increase or decrease the effective length of said outlet conduit.

15. The device in claim 14 wherein said feed outlet has holes therein and said open member is a sleeve having adjustment holes therein, and an adjustment member for said holes.

* * * * *